US012162127B2

(12) United States Patent
Simek et al.

(10) Patent No.: US 12,162,127 B2
(45) Date of Patent: Dec. 10, 2024

(54) SYSTEMS AND METHODS FOR A SETTING TOOL HAVING AN INTEGRATED PRISM

(71) Applicant: Hilti Aktiengesellschaft, Schaan (LI)

(72) Inventors: Philipe Simek, Lantana, TX (US); Matteo Spampatti, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 314 days.

(21) Appl. No.: 17/682,474

(22) Filed: Feb. 28, 2022

(65) Prior Publication Data
US 2023/0271308 A1    Aug. 31, 2023

(51) Int. Cl.
*B25D 1/16* (2006.01)
*B25D 1/00* (2006.01)
*G02B 7/18* (2021.01)
*G02B 27/64* (2006.01)

(52) U.S. Cl.
CPC .................. *B25D 1/16* (2013.01); *B25D 1/00* (2013.01); *G02B 7/1805* (2013.01); *G02B 27/646* (2013.01)

(58) Field of Classification Search
CPC ....................................................... B25D 1/16
See application file for complete search history.

(56) References Cited

U.S. PATENT DOCUMENTS

| 5,199,625 | A | * | 4/1993 | Dewey | B25C 1/184 |
| | | | | | 227/139 |
| 5,509,489 | A | * | 4/1996 | Lower, Jr. | B25C 7/00 |
| | | | | | 227/156 |
| 2021/0245343 | A1 | * | 8/2021 | Spampatti | B25C 5/1693 |

FOREIGN PATENT DOCUMENTS

| EP | 3 192 614 B1 | 4/2019 | |
| EP | 4088872 A1 * | 11/2022 | ............ B25C 1/047 |
| WO | WO-2020007706 A1 * | 1/2020 | ............ B25B 31/00 |

* cited by examiner

*Primary Examiner* — Michelle Lopez
(74) *Attorney, Agent, or Firm* — Leydig, Voit & Mayer, Ltd.

(57) ABSTRACT

A setting tool system includes a housing. The housing includes a first conduit that receives one or more anchoring systems at a first end, and a second conduit at least partially separated from the first conduit with an interior wall. The second conduit includes a weighted shaft that moves freely within the length of the second conduit. The first and second conduits merge at a second end opposite the first end. Each of the one or more anchoring systems inserted at the first end are individually received at the opening at the second end. Each anchoring system is individually fastened via the weighted shaft to the external surface. The setting tool system includes a prism system removably coupled to the housing, where the prism system is configured to aid in identifying one or more installation locations.

12 Claims, 2 Drawing Sheets

SYSTEMS AND METHODS FOR A SETTING TOOL HAVING AN INTEGRATED PRISM

BACKGROUND OF THE INVENTION

The present disclosure relates generally to the field of anchoring systems, and more particularly to a setting tool utilized in deck construction. Specifically, the present embodiments are related to a setting tool having an integrated prism that may be utilized to both identify a location and install the anchoring system on a concrete deck.

In typical construction sites, deck construction (e.g., decking) is often utilized to build the floors and ceilings of multiple story buildings. In such buildings, anchoring systems may be installed to suspend various construction elements (e.g., pipes, sprinkler systems, HVAC components, conduits, electrical elements, etc.) from the ceiling. In certain situations, the position of the anchoring system on the deck may be first measured and identified, and the anchoring systems may be positioned on the identified location before concrete is poured. For example, a wood form, a fluted, and/or a corrugated metal sheet of alternating peaks and valleys may be installed as a base. Further, various anchoring systems are positioned throughout the deck based on the desired function and position of the construction elements that the anchoring systems are configured to support within the building. After the anchoring systems are properly positioned in the base, concrete is poured over the base, thereby securing and embedding the anchoring system. After formation of the deck (e.g., the floors and ceilings of the building), a male or female connection may be threaded into the anchoring system to securely suspend or fasten the construction element from the ceiling.

In certain situations, a first worker may measure and identify a location on the deck to install the anchoring system. Next, a second worker may individually install each anchoring system by bending over, positioning the anchoring system on the deck, and securing the anchoring system to the deck with a tool (e.g., hammer). In some situations, a single worker may use multiple tools to measure, identify, and install anchoring systems. However, such techniques are time consuming because a typical construction site may require a vast number of anchoring systems positioned at precise locations on the deck. Further, in some situations, it may be difficult for the workers to find the space to bend over with a tool (e.g., hammer) to position the anchoring system at a precisely identified location. Accordingly, there is a need for a setting tool that improves the efficiency and ease of identifying a location and installing anchoring systems on decks. Specifically, there is a need for a single tool that allows a worker to measure, identify a precise location, and additionally install one or more anchoring systems.

BRIEF SUMMARY OF THE INVENTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a setting tool system includes a housing. The housing includes a first conduit that receives one or more anchoring systems at a first end, and a second conduit at least partially separated from the first conduit with an interior wall. The second conduit includes a weighted shaft that moves freely within the length of the second conduit. The first and second conduits merge at a second end opposite the first end. Each of the one or more anchoring systems inserted at the first end are individually received at the opening at the second end. Each anchoring system is individually fastened via the weighted shaft to the external surface. The setting tool system includes a prism system removably coupled to the housing, where the prism system is configured to aid in identifying one or more installation locations.

BRIEF DESCRIPTION OF THE SEVERAL VIEWS OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION OF THE INVENTION

Figure 1:
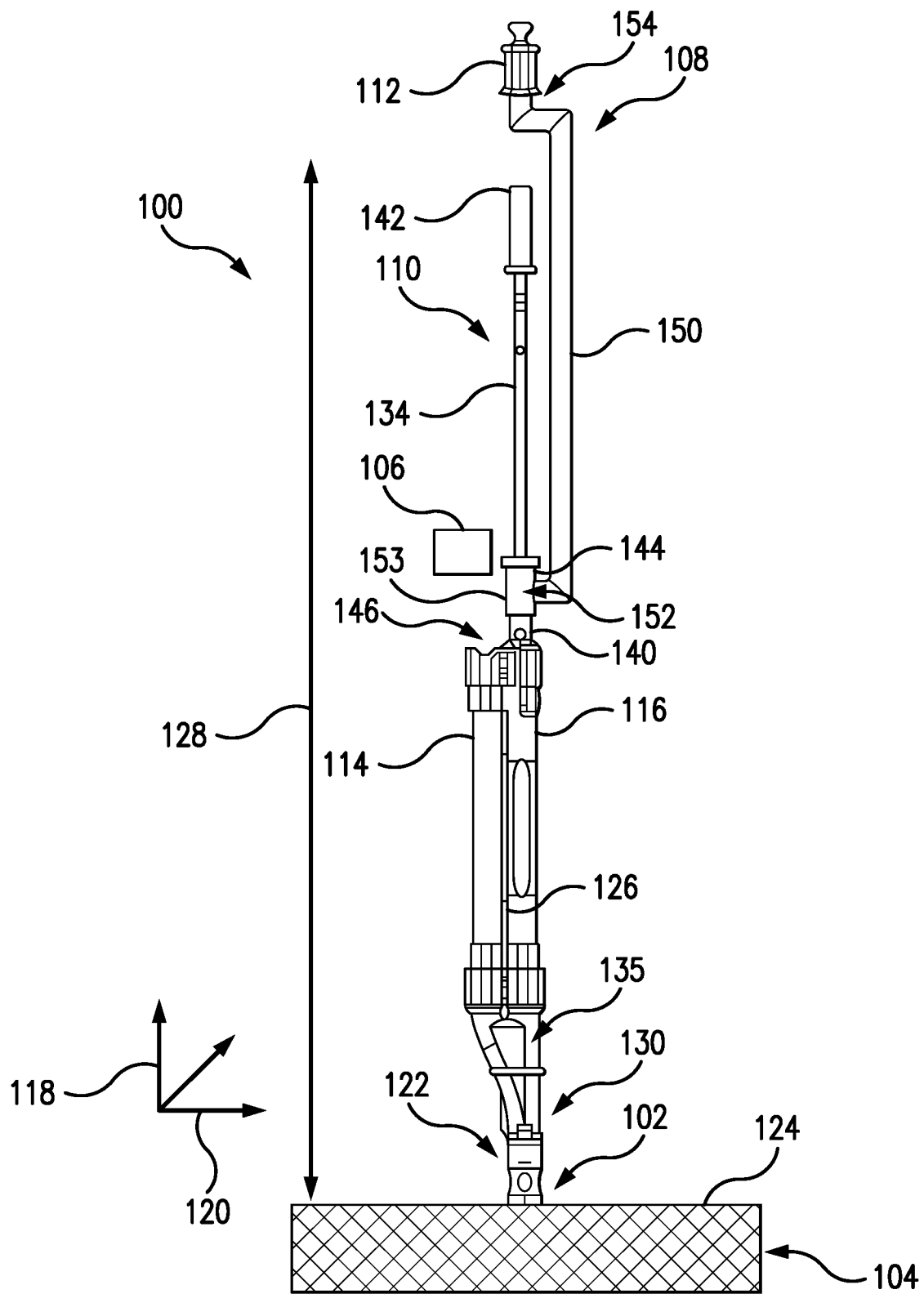
FIG. 1 is perspective view of an embodiment of a setting tool system having a prism system, a feeding tube and a setting tube, where the prism system is coupled to a handle of the setting tool system, in accordance with aspects of certain embodiments.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Present embodiments are directed to a setting tool system that is configured to improve the efficiency and ease of identifying a location and installing one or more anchoring systems on a concrete deck system. Specifically, the setting tool system is a single tool that allows an operator to measure a concrete deck system, identify a precise location for installing an anchoring system, and install the anchoring system at the identified location. In certain embodiments, the setting tool system is a stand-up setting tool system that is configured to be utilized by an operator while standing. Indeed, rather than one or more operators that utilize one or more tools to measure, identify a location, and install the anchoring system with a tool (e.g., hammer), the setting tool system allows the operator to utilize a single tool to measure, identify one or more locations, and install each of one or more anchoring systems at the one or more locations.

Specifically, the operator may utilize a prism system coupled to the setting tool system to identify one or more locations on the concrete deck system to install one or more anchoring systems. Further, the operator may feed one or more anchoring systems into the setting tool system to be installed at the identified locations. In certain embodiments, the operator may physically move the setting tool system to an identified location on the deck, release a single anchoring system at the location, and manually actuate a setting tool (e.g., hammer) within the setting tool system to install (e.g., securely fasten) the released anchoring system to the deck at the identified location. The operator may repeat this process as needed, either by feeding another anchoring system into the setting tool system and/or by moving to the next installation location on the deck.

In this manner, the setting tool system improves the efficiency of the operator, at least in part because the operator does not utilize separate tools to identify a location and to install the anchoring system. Further, the operator does not need to bend over to individually install each anchoring system within the deck. In certain embodiments, the setting tool system improves the efficiency and ease of installation at least in part because the operator may preload and prepare one or more anchoring systems into the setting tool system rather than prepare each anchoring system at the site of the install. For example, in certain embodiments, the setting tool system may be pre-loaded with one or more anchoring systems (e.g., 2, 3, 4, 5, 6, 7, 8, 9, 10, etc.), allowing the operator to move between locations on the deck. In this manner, the anchoring system may be prepared or preloaded prior to installation, thereby providing the operator with greater flexibility in the workflow. Accordingly, the operator may consecutively identify locations on the deck and install anchoring systems.

Turning now to the drawings, FIG. 1 is a perspective view of an embodiment of a setting tool system 100 for identifying installation locations 102 on a deck system 104, and then subsequently installing one or more anchoring systems 106 at the identified installation locations 102. In certain embodiments, the setting tool system 100 includes a prism system 108 that is removably coupled to a handle system 110 of the setting tool system 100. The prism system 108 includes a prism 112 configured to aid in identifying one or more installation locations 102 within a particular area or an environment (e.g., the deck system 104, a job site, a building, a warehouse, a construction zone, etc.). In certain embodiments, the prism system 108 may be utilized to identify one or more installation locations 102 on the deck system 104. Further, the setting tool system 100 may then be utilized to install the one or more anchoring systems 106 at the identified installation locations 102. In certain embodiments, the setting tool system 100 is configured to be utilized by an operator standing up, such that the operator may position the setting tool system 100 in various locations across the deck system 104, so that a measuring interface can locate the prism system 108 and identify the installation location 102. Further, the operator may continuously install one or more anchoring systems 106 into the deck system 101 with the setting tool system 100, without repeatedly pausing to bend over and/or preload and/or prepare the anchoring systems 106. In this manner, the setting tool system 100 improves the efficiency of the operator, at least in part because the operator does not separate tools to measure/identify a location for installation, and install the anchoring system.

In the illustrated embodiment, the setting tool system 100 includes a feeding tube 114 coupled to a setting tube 116. In certain embodiments, the feeding tube 114 and the setting tube 116 may be hollow conduits that are parallel to a vertical axis 118 of the setting tool system 100. During use, an operator may position the setting tool system 100 approximately perpendicular to the deck system 104, which may be along a horizontal axis 120, such that the setting tool system 100 is positioned to operate "standing up." Specifically, during operation, the head 122 of the setting tool system 100 may be configured to make physical contact with a top surface 124 of the deck system 104. In certain embodiments, the feeding tube 114 and the setting tube 116 are coupled via the housing of the setting tool system. Further, in certain embodiments, the feeding tube 114 may be separated from the setting tube 116 via an interior wall 126 of the housing, where the interior wall 126 is at least a portion of the length 128 of the setting tool system 100. Further, the hollow conduits of the feeding tube 114 and the setting tube 116 may merge together at a second end 130 of the setting tool system 100, such that the two channels merge together to form a single channel or conduit. In certain embodiments, the cross-sectional diameter of the merged conduit may be approximately the same size as the cross-sectional diameter of the setting tube 114. Accordingly, an anchoring system 106 fed through the feeding tube 114 may travel through the hollow conduit and be positioned at an opening of the head 122 of the setting tool system 100, thereby making direct contact with the top surface 124 of the deck system 104.

In certain embodiments, the setting tool system 100 includes a setting tool 132 (e.g., hammer 132) (illustrated in FIG. 2) coupled to a manually adjustable handle 134. In particular, the setting tool 132 may be disposed within the setting tube 116, and may be configured to slide along a portion of the length of the setting tube 116. In other words, an operator engaging the manually adjustable handle 134 may move the setting tool 132 within the hollow conduit upwards and downwards along the vertical axis 118. In certain embodiments, as the operator engages the manually adjustable handle 134, the weight of the setting tool 132 (e.g., hammer 132) impacts an anchoring system 106 positioned at the head 122, and repeated impacts to the anchoring system 106 may help fasten the anchoring system 106 into the installation location 102 on the deck 104. For example, in certain embodiments, the setting tool 132 may be configured to repeatedly move a distance 136 (illustrated in FIG. 2), which may be a portion of the distance 128, to help fasten the anchoring system 106 into the deck 104.

In certain embodiments, the handle system 110 may include the manually adjustable handle 134, a fastening region 140 configured to receive a removable fastener, and a hand support 142. The hand support 142 may be ergonomically designed for the operator so that the operator may be comfortable supporting the setting tool system 100 while engaging the setting tool 132 along the vertical axis 118. The fastening region 140 may be configured to receive a removable fastener (e.g., a clamp 144) to removably couple the prism system 108 to the handle system 110, as further described below. In certain embodiments, the handle system 110 is adjustable along the vertical axis, such that the prism height 137 may be increased or decreased. Increasing the height of the prism system 108 may ensure that the line of sight is not blocked by obstacles, such as objects and/or operators on the deck system 104.

In certain embodiments, the setting tool system 100 includes a feeding tube 114 having a first end with an aperture 146 configured for receiving the one or more anchoring systems 106. In certain embodiments, the anchoring systems 106 may be various sizes and shapes, depending on the desired function of the construction element (e.g., pipes, sprinkler systems, HVAC components, conduits, electrical elements, etc.) the anchoring system is configured to support. For example, in certain embodiments, the anchoring system 106 may be a cast-in anchor of any size or shape, such as a cast-in anchor having threads configured as: ¼"-⅜", ¼"-⅜"-½", ⅜", ⅜"-½", ⅜"-½"-⅝", ½", ½"-⅝"-¾", ⅝"-¾", or ⅜"-½"-⅝"-¾".

In certain embodiments, the operator may insert a single anchoring system 106 into the feeding tube 114, and secure the single anchoring system 106 to the deck system 104 via the setting tool system 100, before inserting and installing a subsequent anchoring system 106. In certain embodiments, the operator may feed one or more anchoring systems 106 through the feeding tube 114 at the same time, such that a series of anchoring systems 106 are stacked within the hollow conduit of the setting tool system 100. For example, the operator may desire to preload and prepare a desired number of anchoring systems 106 into the feeding tube 114. After preloading the setting tool system 100, the operator may consecutively fasten the preloaded anchoring systems 106 to the deck system 104. In certain embodiments, the anchoring systems 106 may be configured with one or more features (e.g., attachments, fasteners, preformed holes, preformed indentations, etc.) that allow each anchoring system 106 to be stacked on the previous anchoring system 106 within the series. Further, in certain embodiments, the same type (e.g., size and shape) of anchoring system 106 may be utilized when a series of anchoring systems 106 are preloaded and/or prepared within the hollow conduit of the feeding tube 114. However, in other embodiments, any type (e.g., size or shape) of anchoring system 106 may be utilized when a series of anchoring systems 106 are utilized within the feeding tube 114.

In certain embodiments, the prism system 108 includes the prism 112, an extension 150, a fastener 152, and an adapter 154. The prism system 108 may be removably coupled to the fastening region 140 of the handle system 110 via the fastener 152. The fastener 152 may be a clamp, screws, a clasp, a clip, or any other form of fastener that allows the prism system 108 to be removably and securely coupled to the handle system 110. In certain embodiments, the prism system 108 may be easily removed and/or reattached, allowing the functionality of the prism 112 to be easily incorporated into the setting tool system 100. In certain embodiments, the prism 112 may be removably coupled to the prism system 108 via the adapter 154. The adapter 154 allows the operator to detach the prism 112 and replace it with a different prism 112, thereby allowing the operator greater functionality in the type of measuring device utilized with the setting tool system 100. As noted above, the prism system 108 may allow an operator to identify an area on a job site (e.g., the deck 104) to spatially determine installation locations 102 where anchoring systems 106 may be installed. In certain embodiments, the operator may utilize the setting tool system 100 to determine or more installation locations 102, and consecutively install one or more anchoring systems 106 to the deck system 104.

In certain embodiments, the fastening region 140 includes a vibration dampening mechanism 153 that absorbs impact energy from the setting tool 132. Specifically, the setting tool 132 (e.g., hammer 132) may be used to install an anchoring system 106 into the deck 104 by repeated impacts that may damage the prism 112. In certain embodiments, the vibration dampening mechanism 153 may include a network of springs and dampers and may be a spring-mass damper that protects the prism 112 from impact energy. In certain embodiments, the vibration dampening mechanism 153 may be an automatic voltage regulator (AVR).

Figure 2:
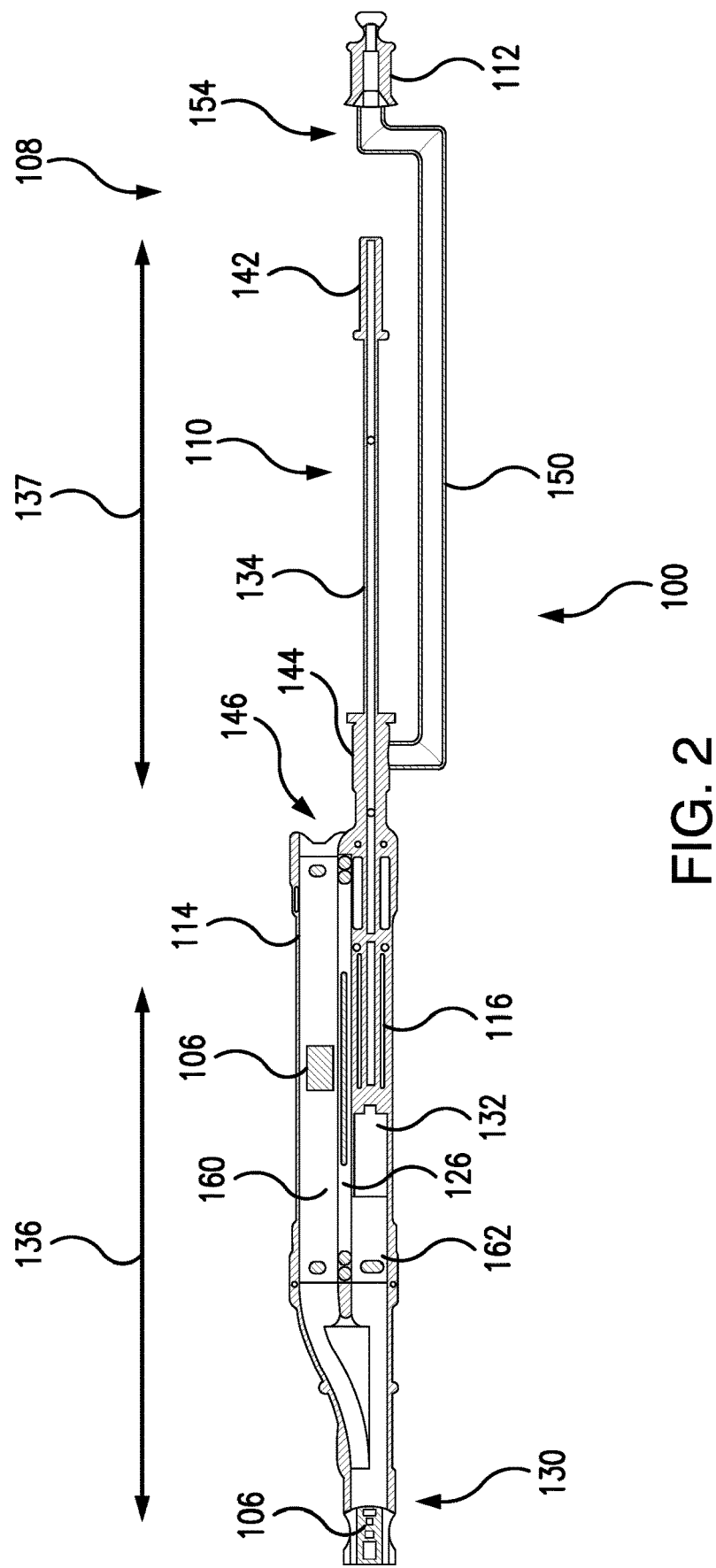
FIG. 2 is a cross-sectional view of an embodiment of the setting tool system of FIG. 1, in accordance with aspects of certain embodiments.

FIG. 2 is a cross-sectional view of an embodiment of the setting tool system 100 of FIG. 1, illustrating a setting tool 132 (e.g., manually actuated hammer) disposed within the setting tube 116 of the setting tool system 100. Specifically, the setting tube 116 includes a first hollow conduit 162 that is substantially parallel to a second hollow conduit 160 of the feeding tube 102. In particular, the first and second hollow conduits 160, 162 may be independent chambers substantially parallel to each other until they merge at a merging chamber 135 disposed at the second end 130 of the setting tool system 100. Specifically, the second hollow conduit 160 of the feeding tube 102 is configured to merge into the first hollow conduit 162, such that each of the one or more anchoring systems 106 are configured to travel from the receiving aperture 146 of the first hollow conduit 160 to the second end 130.

In certain embodiments, the setting tool 132 may be a manually actuated hammer that is disposed within the setting tube 116 of the setting tool system 100. Specifically, the setting tool 132 may comprise a shaft portion coupled to a weight portion. The shaft portion may extend through the handle 142 of the setting tool system 100, such that engaging the handle 142 engages the shaft portion and the weight portion. As noted above, the weight portion of the setting tool 132 may be configured to fasten the anchoring system 106 into the deck system 104. For example, as further described with respect to FIG. 3, the anchoring system 106 positioned at the receiving aperture 146 of the setting tool system 100 may be fastened into the deck system 104 via the vertical movement of the setting tool 132. It should be noted that the cross-sectional area of the head and/or the opening is smaller than the cross-sectional area of the feeding tube 114 and the setting tube 116. Indeed, the smaller cross-sectional area of the head and/or the opening allows the installer to reach tight spaces on the deck system 104.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A setting tool system, comprising:
 a housing, comprising:
  a first conduit configured to receive one or more anchoring systems at a first end;
   a second conduit at least partially separated from the first conduit with an interior wall, wherein the second conduit comprises a weighted shaft configured to freely move within the length of the second conduit, and wherein the first and second conduits merge at a second end opposite the first end;
   a head comprising an opening at the second end, wherein each of the one or more anchoring systems inserted at the first end are individually received at the opening at the second end, and wherein a top surface of each of the one or more anchoring systems contacts the weighted shaft, and wherein a bottom surface of each of the one or more anchoring systems contacts an external surface of an installation location, and wherein each of the one or more anchoring systems are fastened via the weighted shaft to the external surface; and a prism system removably coupled to the housing, wherein the prism system is configured to aid in identifying one or more installation locations, wherein a height of the prism system relative to the head of the setting tool system is adjustable.

2. The setting tool system of claim 1, wherein the prism system is removably coupled to a fastening region of the housing of the setting tool system.

3. The setting tool system of claim 2, wherein the fastening region comprises a vibration dampening mechanism.

4. The setting tool system of claim 1, wherein the prism system comprises a removable prism that allows an operator to identify the one or more installation locations.

5. The setting tool of claim 4, wherein the removable prism is replaced with a second prism that allows the operator to identify the one or more installation locations.

6. The setting tool system of claim 1, wherein the first conduit merges with the second conduit at a merging chamber disposed proximate to the second end.

7. The setting tool system of claim 1, wherein the merging chamber fluidly couples the first and second conduits to the opening of the head.

8. The setting tool system of claim 7, wherein each of the one or more anchoring systems are inserted at the first end via an aperture, and wherein each of the one or more anchoring systems travels from the first end to the opening of the head via the first conduit.

9. The setting tool system of claim 1, wherein the weighted shaft is manually actuated by an operator via a handle.

10. The setting tool system of claim 1, wherein the weighted shaft is actuated by a power tool coupled to the weighted shaft.

11. The setting tool system of claim 1, wherein the external surface is a wood deck.

12. The setting tool system of claim 1, wherein the anchoring system is a cast-in anchor.

* * * * *